Patented Apr. 14, 1931

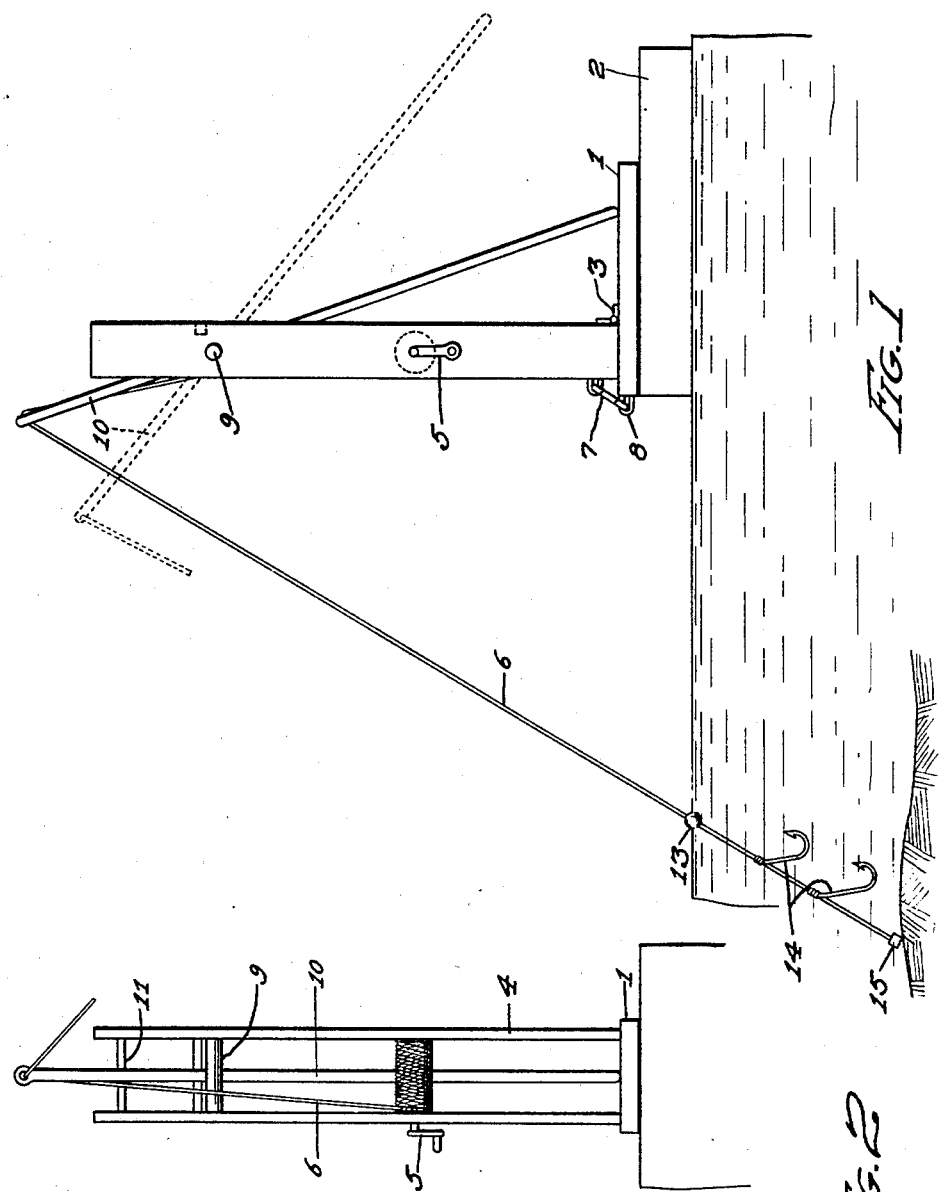

1,800,607

UNITED STATES PATENT OFFICE

NICHOLAS DECKER, OF CHICAGO, ILLINOIS

FISHING SIGNAL

Application filed April 28, 1930. Serial No. 447,973.

This invention relates to improvements in fishing signals to indicate unmistakably to a fisherman that he has a fish upon one of his hooks. Frequently when the fish are not biting readily the time passes slowly and the fisherman may become drowsy, restless or inattentive or he may decide to read while fishing. Under such conditions it is possible that a bite may go unnoticed for a brief period of time which may prove just long enough for the nibbler to escape. The present invention will wigwag a signal in such manner that attention will be drawn to it at once.

More specifically the invention consists in the combination and arrangement of parts to be hereinafter fully described, pointed out in the claims and illustrated in the accompanying drawing which forms a part of this application for patent and in which—

Fig. 1 is a view of the fishing signal in side elevation illustrating its application.

Fig. 2 is a front view of Fig. 1.

Like reference characters denote corresponding parts in both views.

This fishing signal is adapted for use in small fishing boats, for fishing from the shore, pier fishing, etc. It comprises a standard erected upon a base that is secured to or rests upon the bottom of the boat or the pier. A teeter pole is supported by the standard and engaged by the fishing line and when a fish is caught upon one of the hooks carried by the line the pull upon the hook and line will teeter the pole or perhaps upend or reverse it thus affording a visual signal that is displayed in a conspicuous manner.

The reference numeral 1 denotes a baseboard adapted to rest upon the pier or boat 2 or to be clamped thereto in any suitable manner if desired. Secured to the base board by the hinge 3 is the frame 4 that carries the reel 5 upon which the fishing line 6 is wound, said frame 4 when not in use being adapted to be folded down upon the baseboard 1 in an out of the way position making it easy to transport and to pack for shipment. When the frame is in upright position it is held there rigidly by a hook 7 engaging an eye 8 secured to the baseboard.

Mounted in the frame 4 is a split or perforated roller 9 through which the teeter pole 10 extends, the lower end thereof normally resting upon the baseboard 1 and the upper end passing below the stop bar 11 connecting the sides of the frame 4 at their upper ends. The upper end of the teeter pole is perforated for passage therethrough of the line 6 from the reel, the line carrying the usual float 13, hooks 14 and sinker 15.

When the line is cast the mechanism assumes the position shown in full lines in Fig. 1. When a small or medium size fish takes one of the hooks the pull upon the line will cause the pole to teeter upon the roller 9 as indicated in dotted lines, Fig. 1. Should a big fish take the hook the pull upon the line might be enough to upend the pole so that the lower end would stick up in the air, the pole possibly coming against the stop bar 11. In either event the disturbed position of the pole would clearly indicate to the fisherman that a fish was pulling upon one of the hooks. He would then reel in and land the fish.

What is claimed is:—

1. In a fishing signal, a baseboard, a frame hinged thereto, a fastening element for rigidly securing said frame to said baseboard in upright position, a reel carried by said frame, a roller mounted in said frame, a teeter pole secured to said roller with one end normally resting upon said baseboard, said teeter pole having a perforation in one end, a line secured to said reel and extending through the perforation in said teeter pole, and hooks carried by said line.

2. In a fishing signal, a baseboard, a frame hinged thereto, a fastening element for rigidly securing said frame to said baseboard in the upright position of said frame, a reel carried by said frame, a perforated roller mounted in said frame, a stop bar carried by said frame above said roller, a teeter pole extending through said roller with its lower end normally resting upon said baseboard, said teeter pole having an eye at one end, a line secured to said reel and passing through the eye of said teeter pole, and hooks carried by said line.

In testimony that I claim the foregoing as my own, I have hereto affixed my signature.

NICHOLAS DECKER.